United States Patent [19]

Marchese et al.

[11] Patent Number: 5,394,264
[45] Date of Patent: Feb. 28, 1995

[54] ELECTROCHROMIC WINDOW, BASED ON A POLYMERIC POLYEPOXY ELECTROLYTE

[75] Inventors: Luca Marchese, Milan; Stefano Passerini, Rome; Maria Andrei, Berceto; Bruno Scrosati, Rome; Arnaldo Roggero, San Donato Milanese, all of Italy

[73] Assignee: Eniricerche S.p.A., Milan, Italy

[21] Appl. No.: 149,138

[22] Filed: Nov. 8, 1993

Related U.S. Application Data

[63] Continuation of Ser. No. 696,211, May 6, 1991, abandoned.

[30] Foreign Application Priority Data

Jun. 13, 1990 [IT] Italy .................. 20632 A/90

[51] Int. Cl.[6] .................................. G02F 1/53
[52] U.S. Cl. ........................... 359/270; 252/62.2; 359/275; 428/336; 428/414; 428/432; 428/433; 428/434; 428/701; 428/702; 429/192; 429/193
[58] Field of Search .............. 252/62.2; 359/270, 275; 429/192, 193; 428/336, 414, 432, 701, 702, 433, 434

[56] References Cited

U.S. PATENT DOCUMENTS

4,832,468 5/1989 Ito et al. .................. 359/275
4,927,246 5/1990 Ito et al. .................. 359/275

OTHER PUBLICATIONS

Journal of the Electrochemical Society, vol. 136, No. 11, Nov. 1989, Manchester, N.H., US, pp. 3394–3395, S. Passerini et al., "An Electrochromic Window Based on $Li_xWO_3/(PEO)_8LiClO_4/NiO$".

Primary Examiner—D. S. Nakarani
Attorney, Agent, or Firm—Rogers & Wells

[57] ABSTRACT

An electrochromic window comprises a tungsten oxide electrode on a transparent conductive glass sheet and a nickel oxide counterelectrode. The counterelectrode is activated by electrochemical intercalation of lithium on a transparent conductive glass sheet. The window also comprises a solid polymeric electrolyte interposed between the electrode and the counterelectrode. The electrolyte is formed by a solid solution of an ionic lithium compound in a solid crosslinked polyepoxide. The polyepoxide is obtained by copolymerization of a monoepoxide with a diepoxide.

8 Claims, 2 Drawing Sheets

ELECTROCHROMIC WINDOW, BASED ON A POLYMERIC POLYEPOXY ELECTROLYTE

This application is a continuation of Ser. No. 696,211, filed May 6, 1991, now abandoned.

FIELD OF THE INVENTION

The present invention relates to an electrochromic window, based on a polymeric polyepoxy electrolyte. The electrochromic window has improved characteristics.

DESCRIPTION OF THE PRIOR ART

Optical devices are known in the art which, by applying an electric signal, are capable of switching from a condition of maximum transparency to a condition of minimal transmittance. These devices are considerably interesting from the viewpoint of energy saving, in the field of building industry (smart window), and in the automobile industry.

In these devices, the optical modulation can be suitably induced electrochemically by using electrochromic materials. By using electrochromic materials, compounds are capable of undergoing reversible changes in color following suitable electrochemical processes. A typical example is tungsten oxide, $WO_3$, which turns from transparent into a blue color due to the following electrochemical process:

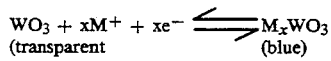

This takes place in a cell containing a transparent electrolyte capable of supplying the intercalating ion $M+$ (normally, an alkali metal ion). If the cell contains another, optically passive, material (i.e., a material which is transparent irrespective of the applied signal being anodic or cathodic, or is a material which is electrochromic with complementary characteristics to $WO_3$, a device is obtained which, when a signal (e.g. a cathodic signal) is applied to it, becomes dark in color. This is due to the formation of blue-colored $M_xWO_3$. If the opposite signal (i.e., an anodic signal) is applied, it turns back to transparent. This is due to the restoration of light-colored $WO_3$. Therefore, by the application of a square-wave signal, the optical transparency of the device can be modulated. The device is thus given characteristics of an electrochromic window, having the important technological implications as above mentioned. For this known art, reference is made in particular to the paper by B. Scrosati in Chimicaoggi, June 1989, pages 41–45.

In the art to which the present invention is directed, a continuous need exists of improving both the laminar configuration of the electrochromic devices in the solid state, and of the electrochromic materials for accomplishing fast and reversible electrochromic processes. In a co-pending patent application, to the same applicant's name, Ser. No. 07/690,306 an electrochromic window is disclosed, which has a laminar configuration and has improved performance, by using a polymeric electrolyte in the solid state. The electrolyte is based on a crosslinked polyether, which is inserted between a layer of tungsten oxide and a layer of nickel oxide. The layers are deposited on a glass support which is made conductive by films of indium and tin oxides.

SUMMARY OF THE INVENTION

The present applicant now discloses that the introduction of a polyepoxy-based, solid, polymeric electrolyte in the electrochromic window makes it possible for the performance thereof to be further improved. In particular regarding the speed of the electrochromic process.

In accordance therewith, the present invention relates to an electrochromic window comprising an electrode comprising a first transparent conductive glass sheet having an inner face. The inner face has a first layer of conductive material comprising tin oxide or tin and indium oxide thereon and a second layer comprising tungsten oxide ($WO_3$) on the first layer. The window also comprises a counter electrode comprising a second transparent conductive glass sheet having an inner face. The second glass sheet is adapted for activation by the electrochemical intercalation of lithium. The inner face of the second glass sheet has a first layer of conductive material comprising tin oxide or tin and indium oxide thereon and a second layer of comprising nickel oxide ($NiO_z$) wherein z comprises the range of from about 1.0 to about 1.66. The window further comprises a solid, polymeric electrolyte interposed between the electrode and the counterelectrode. The polymeric electrolyte comprises a solid solution of an ionic lithium compound in a solid, crosslinked polyepoxy. It is formed by a co-polymerizing a monoepoxide having the formula:

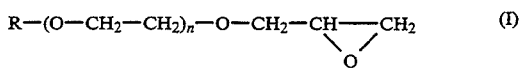

wherein:
R comprises a methyl or ethyl radical; and
n an integer comprising the range of from 1 to 6; with a diepoxide having the formula:

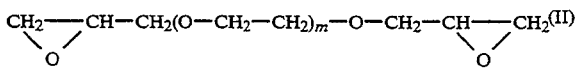

wherein:
m is an integer comprised within the range of from 1 to 6; with a molar ratio of the diepoxide (II) to the monoepoxide (I) comprising the range of from 1:100 to 10:100; the solid crosslinked polyepoxide has an average molecular weight of at least 10,000 AMU, and a glass transition temperature (Tg) comprising the range of from $-60°$ C. to $-80°$ C.

In the electrochromic window of the present invention, the electrode of tungsten oxide can be prepared according to known technologies by depositing, sputtering, or evaporating a thin layer of tungsten oxide ($WO_3$) on a glass sheet. The glass sheet is made conductive by a film of tin oxide or tin and indium oxides. The layer of tungsten oxide typically has a thickness of about 3,000 Å. The conductor glasses are products presently available.

The counterelectrode of nickel oxide can be prepared by known deposition techniques on conductive glass. However, in this initial phase, nickel oxide is not capable of operating as the counterelectrode in an electrochromic window. This condition requires an activation treatment, which essentially comprises a pre-intercalation of lithium. For that purpose, the electrode is charged by an electrochemical cell containing a solution of a lithium salt (e.g., lithium perchlorate) in an aprotic solvent (e.g., propylene carbonate) and a counterelectrode of lithium metal. Due to cathodic polarization, the intercalation of lithium inside nickel oxide is promoted. This process modifies the optical properties of the nickel oxide layer. In fact, due to the lithium entering its structure, nickel oxide becomes transparent and capable of reversibly donating and retaking the lithium. This is accomplished either without loosing its transparency, or by turning into its colored state with an electrochromic process complementary to the process of ($WO_3$).

In the electrochromic window of the present invention, the solid polymeric electrolyte is interposed between the electrode (a) and the counterelectrode (b). The window comprises a solid solution of an ionic lithium compound in a solid, crosslinked polyether.

The ionic compounds of lithium can be advantageously selected from the group consisting of lithium perchlorate, borate, fluoroborate, thiocyanate, hexafluoroarsenate, trifluoroacetate, and trifluoromethanesulphonate. Lithium perchlorate is preferred.

The solid, crosslinked polyepoxide according to the present invention is preferably the product of copolymerizing a diepoxide (II) and a monoepoxide (I). R is a methyl radical and n and m are integers comprising the ranges of from about 1 to about 6, in a mutual molar ratio in the order of from 1:100 to 6:100. The weight average molecular weight comprises the range of from about 10,000 to about 100,000 AMU (Atomic Mass Units).

In the solid polymeric electrolyte, the atomic ratio of oxygen in the polyepoxide to lithium in the ionic compound may comprise the range of from about 6:1 to about 24:1, and preferably is about 14:1.

DESCRIPTION OF THE DRAWINGS

A specific embodiment of the present invention will be described with reference to the following figures, wherein.

DESCRIPTION OF THE PREFERRED EMBODIMENT

Figure 1:
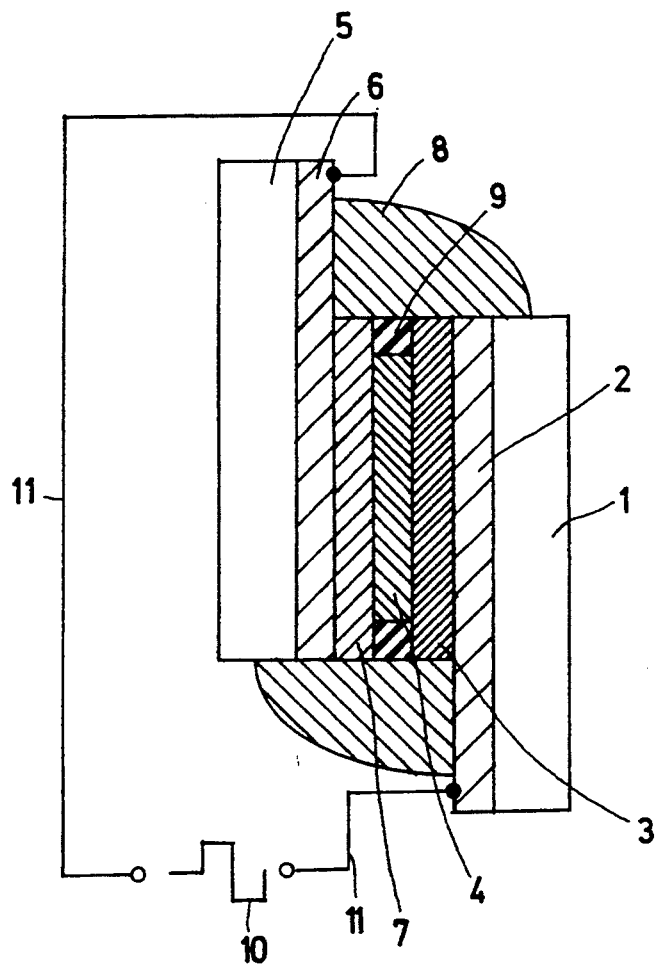
FIG. 1 is a side view of the electrochromic window of the present invention showing wires attached thereto for applying a voltage.

FIG. 1 of the accompanying drawing is a table showing a typical form of the present invention. In particular, element (1) is the glass support, which bears the layer (2) of tin and indium oxide. Onto this layer a layer (3) of tungsten oxide (having a thickness of approximately 3,000 Å) was deposited by sputtering. Element (4) is the solid polymeric electrolyte, which has the shape of a film having a thickness of approximately 100 microns. It comprises a solid, crosslinked polyepoxide containing lithium perchlorate. More particularly, the crosslinked polyepoxide is the product obtained by copolymerizing the diepoxide having the formula

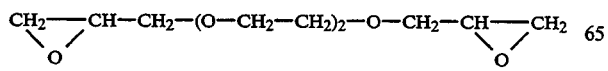

with the monoepoxide having the formula

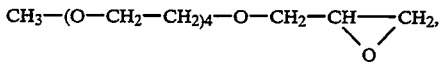

in a mutual molar ratio of 2:100, having a weight average molecular weight of approximately 25,000 AMU and a glass transition temperature (Tg) of $-77°$ C. In this polyepoxide, lithium perchlorate was dissolved so as to have an atomic ratio of oxygen (contained in the polyepoxide) to lithium (contained in the lithium perchlorate) of about 14:1. Numeral (5) represents the glass support, which bears the layer (6) of tin and indium oxide, onto which a layer (7) of nickel oxide, activated by intercalation with lithium, was deposited.

Element (8) is a sealant, (9) is a spacer, and (10) is an external generator of square-wave voltage. Element (11) is the line which connects the voltage source (10) with two terminals connected with the conductor layer of the electrode and the conductor layer of the counterelectrode.

The electrochromic window of FIG. 1 is piloted by a square-wave signal generally variable within the range of from $-2$ volts to $+2$ volts. During the negative impulse (cathodic $WO_3$), the window is dark (intercalation of $WO_3$) and its transmittance is low. During the positive impulse (anodic $WO_3$), the window turns back to transparent (de-intercalation of lithium from $WO_3$), and transmittance is high. This behavior, which can be repeated a very large number of times, is bound to the following process:

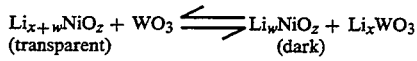

Figure 2:
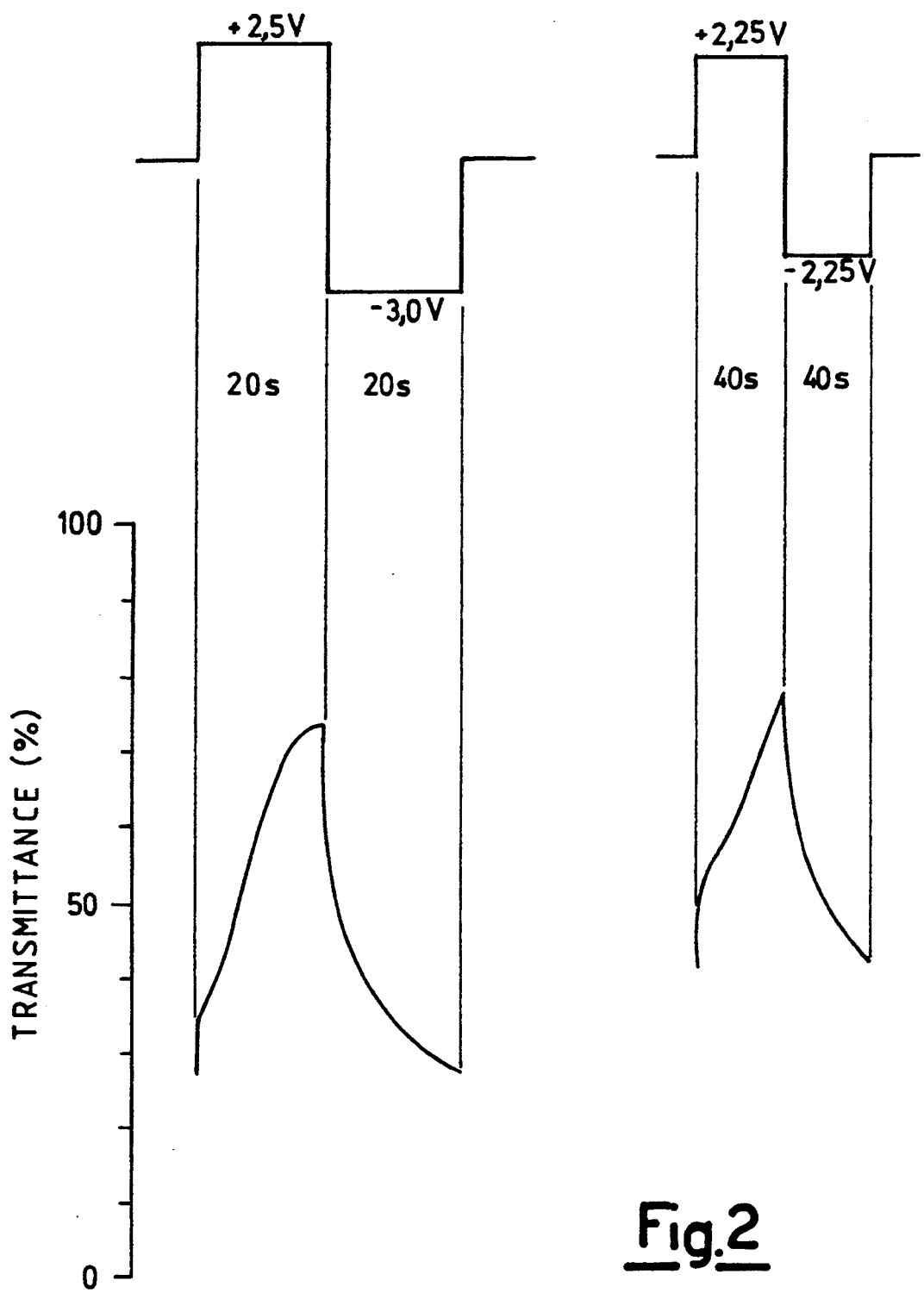
FIG. 2 is a graph showing the transmittance of the electrochromic window of the present invention as a function of the applied voltage.

This behavior is schematically shown in FIG. 2 of the accompanying figures. The time interval necessary for the completion of the electrochromic processes (i.e., the cathodic and anodic processes) is of the order of tens of seconds. This time varies with the varying values of the signal which pilots the cell. In the case of a square-wave of from $+2.5$ volts to $-3$ volts, the change in transmittance between the minimum and the maximum values thereof, and vice-versa, is obtained within a time of approximately 20 seconds.

We claim:

1. An electrochromic window, comprising:
   a. an electrode comprising a first transparent conductive glass sheet having an inner face, wherein said inner face has a first layer of conductive material comprising tin oxide or tin and indium oxides thereon and a second layer comprising tungsten oxide ($WO_3$) on said first layer;
   b. a counter-electrode comprising a second transparent conductive glass sheet having an inner face, wherein said second glass sheet is adapted for activation by the electrochemical intercalation of lithium, and wherein said inner face of said second glass sheet has a first layer of conductive material comprising tin oxide or tin and indium oxides thereon, and a second layer comprising nickel oxides ($NiO_z$), wherein z comprises the range of from about 1 to about 1.66; and
   c. a solid polymeric electrolyte interposed between said electrode and said counter-electrode, wherein said solid polymeric electrolyte comprises a solid solution, wherein said solid solution includes an ionic lithium compound in a solid crosslinked polyepoxide; wherein said polyepoxide is formed by copolymerizing a monoepoxide having the formula

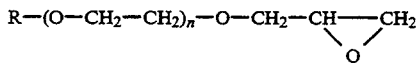

wherein:
R is a methyl or ethyl radical; and
n is an integer from 1 to 6;
with a diepoxide having the formula:

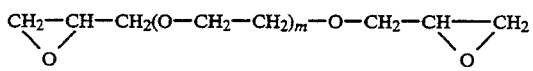

wherein:
m is an integer from 1 to 6;
wherein said diepoxy and said monoepoxy have a molar ratio within the range of from about 1:100 to about 10:100; wherein said solid crosslinked polyepoxide has a weight average molecular weight within the range of from 10,000 to 100,000 and a glass transition temperature (Tg) within the range of from about—60° C. to about −80° C.; and wherein the atomic ratio of oxygen in said polyepoxide to lithium in said ionic lithium compound is within the range from 6:1 to 24:1.

2. The window of claim 1, wherein, in said electrode, said tungsten oxide layer is about 3,000 Å thick on said first glass sheet and wherein said tungsten oxide layer is deposited by sputtering or evaporation.

3. The window of claim 1, wherein, in said counterelectrode, said inner face of said conductive glass sheet, which has a first layer of said tin oxide or said tin and indium oxides thereon and a second layer of said nickel oxide thereon, is activated by electrochemical intercalation of lithium.

4. The window of claim 1, wherein said ionic lithium compound is selected from the group consisting of lithium perchlorate, lithium borate, lithium fluoroborate, lithium thiocyanate, lithium hexafluoroarsenate, lithium trifluoroacetate and lithium trifluoromethane sulphonate.

5. The window of claim 4, wherein said ionic lithium compound is lithium perchlorate.

6. The window of claim 1, wherein said solid crosslinked polyepoxide is formed by copolymerizing said diepoxide and said monoepoxide, wherein R is said methyl radical and n and m are integers within the range of from 1 to 6, wherein said molar ratio is within the range of from 1:100 to 6:100, and wherein the atomic ratio of oxygen to lithium is 14:1.

7. The window of claim 1, wherein said oxygen of said polyepoxide has a ratio to said lithium of said ionic compound of 14:1.

8. The window of claim 1, further comprising a source for producing voltage, wherein said voltage has a square-wave form and connecting lines; wherein one of said connecting lines connects said source with said conducting layers of said electrode and another of said connecting lines connects said source with said conducting layers of said counterelectrode.

* * * * *